Dec. 13, 1927.
J. BOLGIANO
AIRCRAFT
Filed Feb. 9, 1925
1,652,554
4 Sheets-Sheet 3
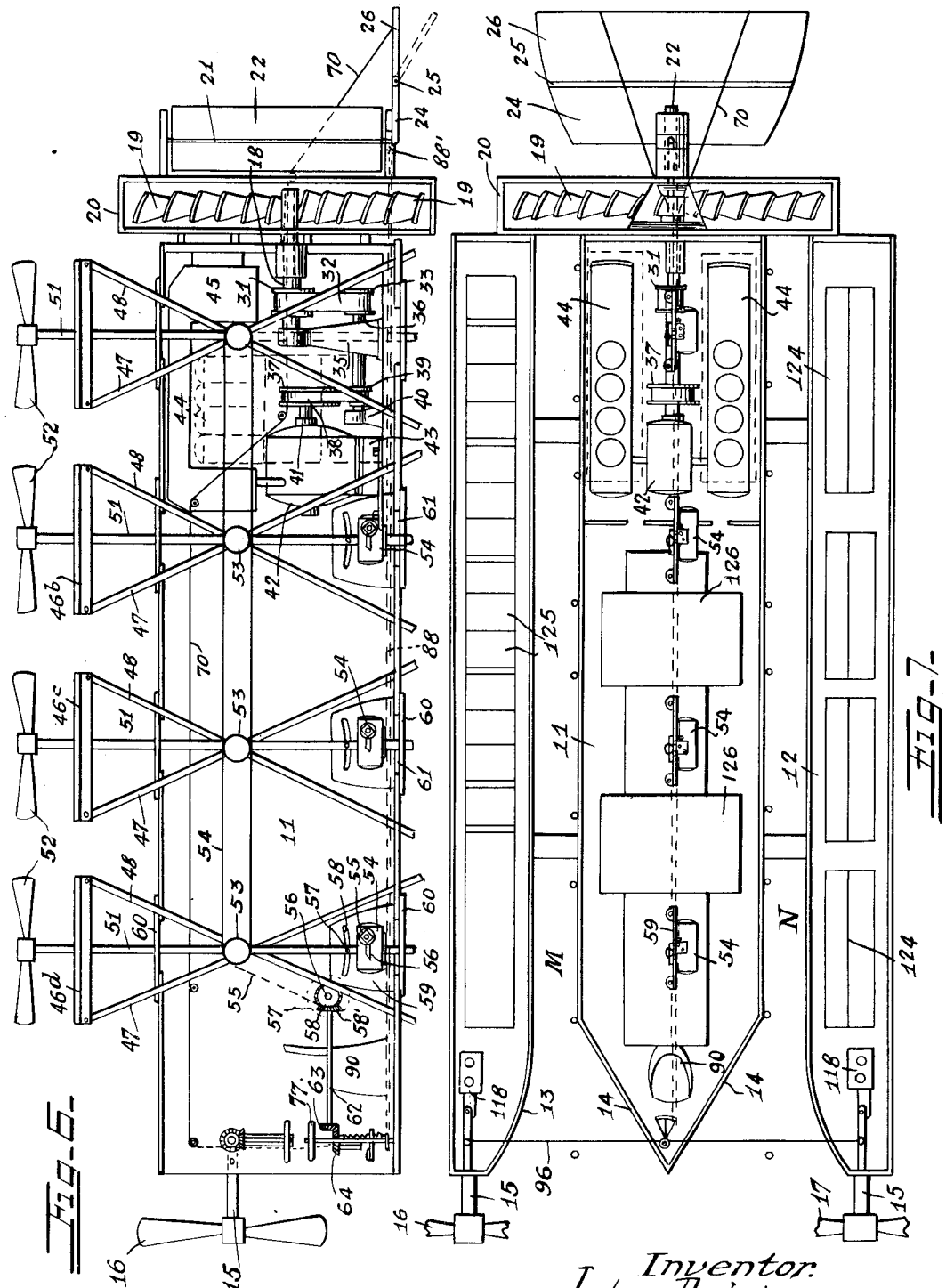
Inventor:
John Bolgiano
by George C. Heinicke
Attorney Dec. 13, 1927.
J. BOLGIANO
AIRCRAFT
Filed Feb. 9, 1925
1,652,554
4 Sheets-Sheet 4
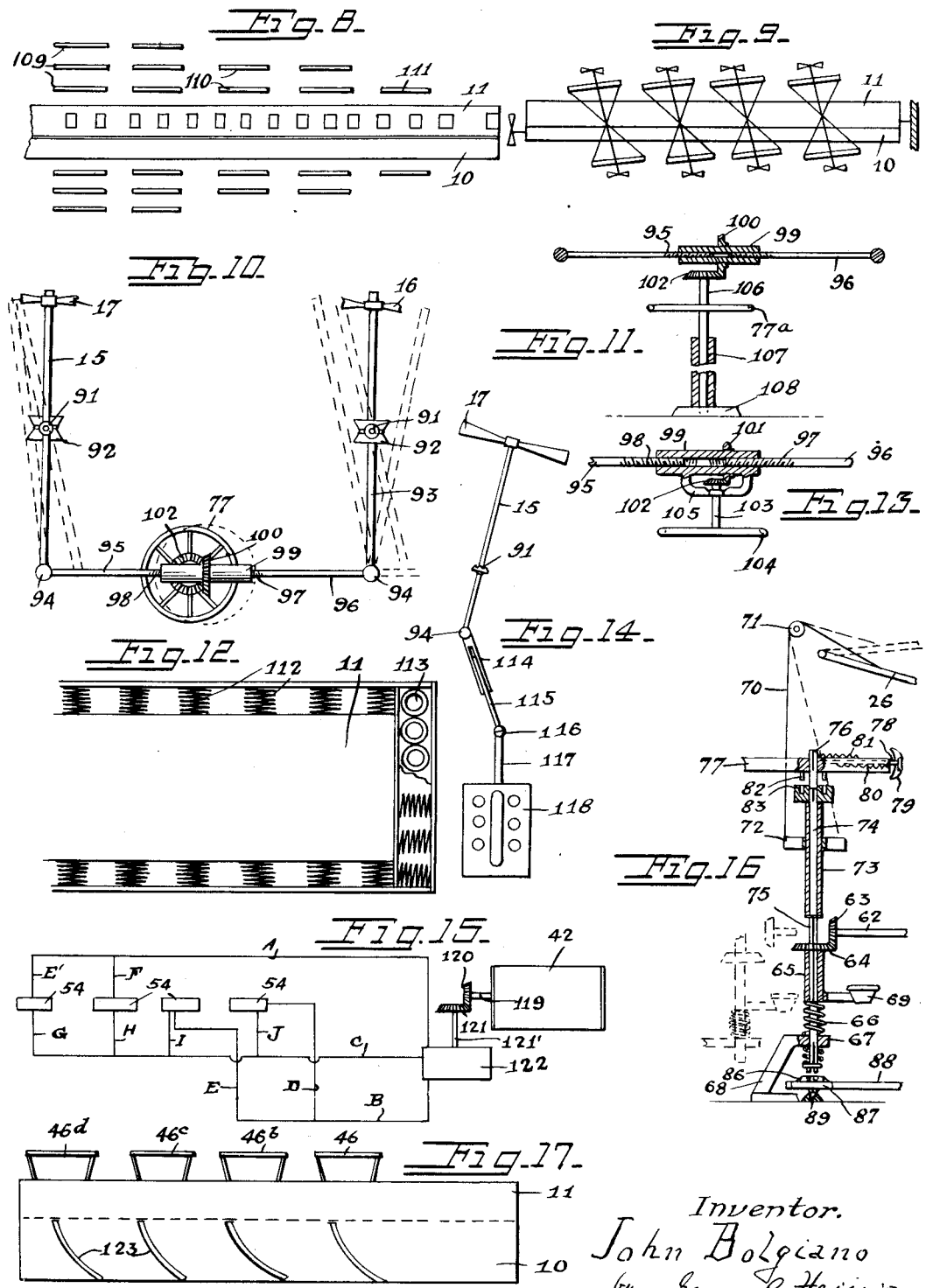
Inventor.
John Bolgiano
by George C. Heinium
Attorney Patented Dec. 13, 1927.

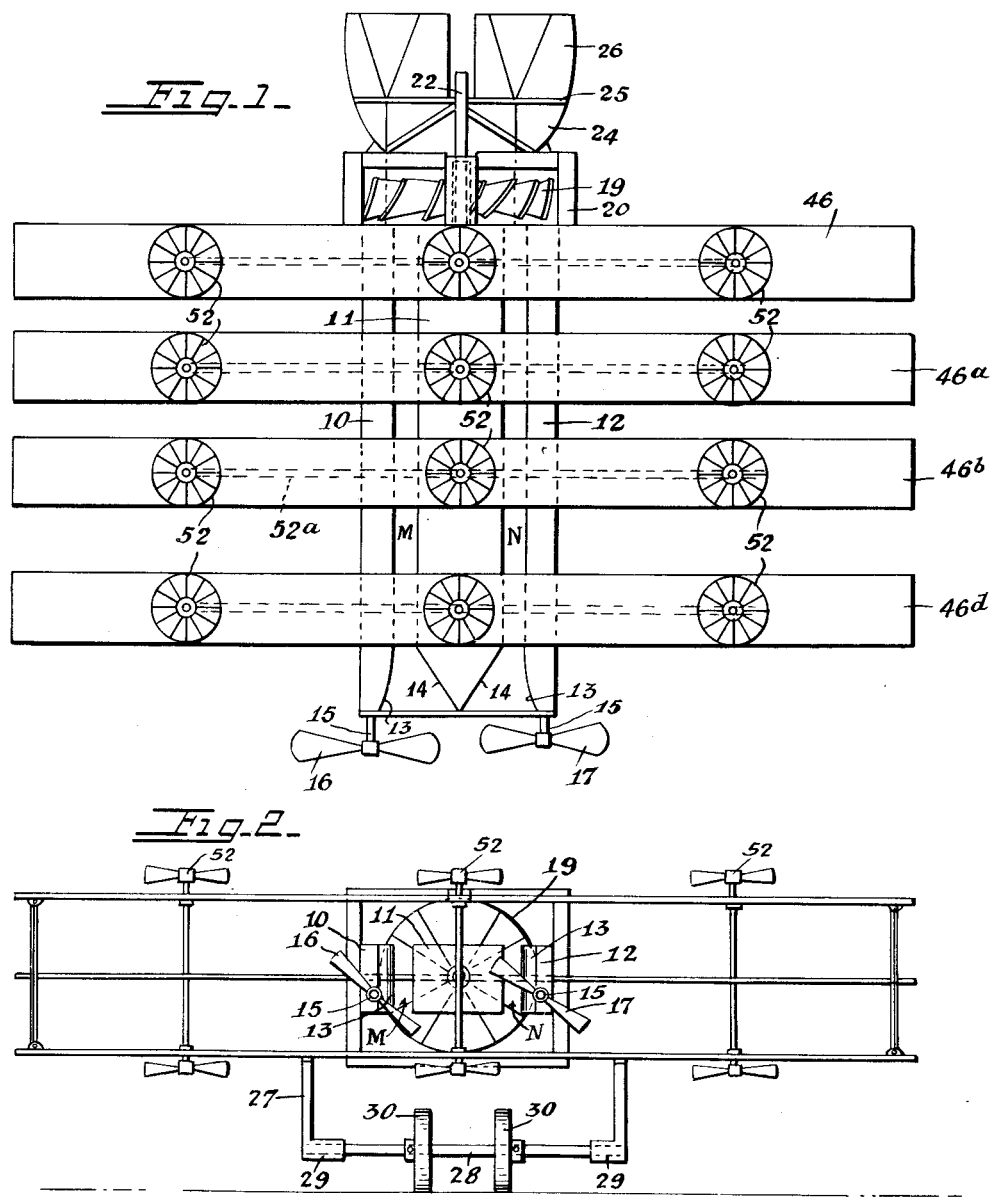

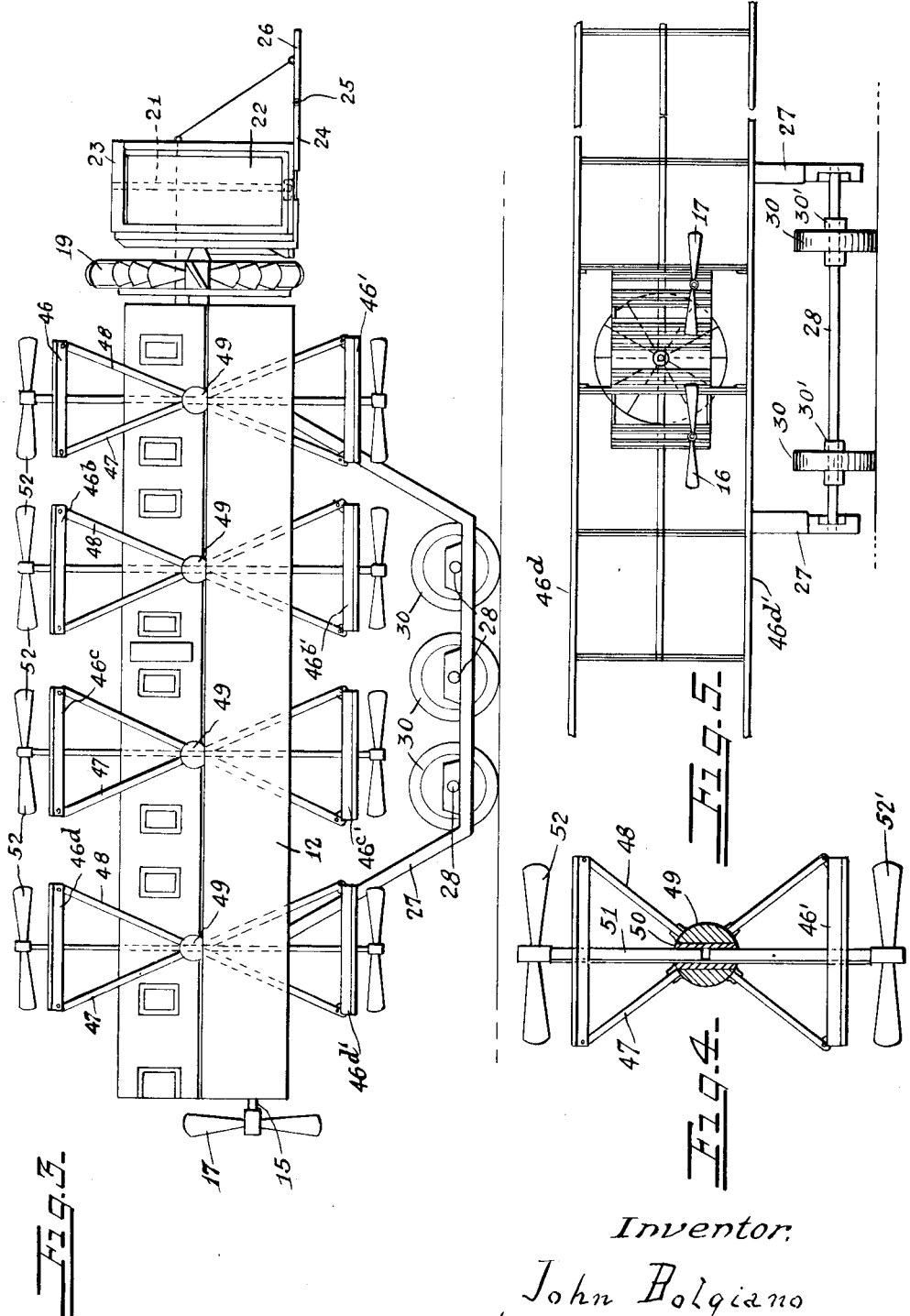

1,652,554

UNITED STATES PATENT OFFICE.

JOHN BOLGIANO, OF NEW YORK, N. Y., ASSIGNOR TO WORLD-WIDE PATENT ENTERPRISES, INC., A CORPORATION OF DELAWARE.

AIRCRAFT.

Application filed February 9, 1925. Serial No. 7,961.

This invention relates to improvements in aircraft and has for its object to provide a simple, efficient and powerful aeroplane or airship designed to develop great speed, accurate navigation, and capable of supporting and hauling cargo and passengers.

One of the objects of the present invention is to provide aircraft with means for maintaining it in perfect equilibrium while the machine is in flight. To this end I have devised a combination propeller and stabilizing agent which is capable not only of driving the machine at a greater speed than is atttained by use of the conventional propellers but which also assists in balancing the machine in its flight.

Another object of the present invention is to provide aircraft which utilizes the supporting power of artificial air gusts or currents to obtain greater sustaining and stabilizing power for the ship proportionately to the weight of the latter.

Another object of the present invention is to create air pressure against the opposing sides of a cabin for the purpose of balancing the same in motion so that the air displaced by the reaction of the machine against the atmosphere is made to do work in stabilizing the machine.

A still further object of the present invention is to maintain the lateral and longitudinal stability of the machine while in flight in practically every condition of the atmosphere pressure and densities which produce air gusts, eddies, etc. The tendency of my invention is to minimize the disturbance of the atmosphere during the forward flight of the machine thereby increasing head resistance.

In carrying out the present invention I have so designed the parts thereof as to conduce towards attaining a more economical and efficient arrangement and balancing of masses about the longitudinal axis of the machine, whereby better stabilizing tractive force is obtained. Use is made of a plurality of sustaining bodies one being a central cabin flanked by two fuselages, there being a separate propeller connected at one end of the machine to said fuselages, and a multi-fan propeller connected at the other end of the machine to the cabin.

Owing to this construction the machine when in operation and in flight establishes perfect equilibrium because there is a parallel pull exerted in driving the machine. The multi-blade propeller is larger than either of the other driving propellers and serves to create a suction in two air channels formed between the fuselages and the central cabin whereby air currents are forcibly caused to impinge against the opposite sides of the cabin of sufficient density to prevent the machine or planes from pitching readily.

A still further object of the present invention is to inaugurate a low-level propulsion for airships and aeroplanes because the nearer to the surface of the earth the ship flies the heavier the air pressure and the denser the air the greater the resistance offered to the propeller blades, hence the greater the speed attained. The large multi-fan or blower propeller creates great speed and at the same time causes a prodigious displacement of air in upward currents in the lateral air channels causing the sides of the cabin to react thereagainst to maintain the side walls thereof properly balanced against natural gusts or eddies.

The two front propellers are relied upon not so much for the purpose of driving the machine as for the purpose of maintaining the equilibrium of the machine assisted by the rear large multi-fan propeller which is the main driving propeller.

A still further object of the present invention is to provide a flying machine with a series of planes extending from one end of the machine to the other in order to multiply the resistance against the action of the atmosphere reacted upon.

Another object of the present invention is to provide a unitary compact control for operating the plane tilting mechanism, the vertical rudder and the horizontal rudder respectively. This unitary control is designed to operate all of these parts interchangeably separately or conjunctively.

In general the present invention aims to provide aircraft fit for commercial use for the transportation of heavy bodies speedily and safely, making it possible to cover greater distances without intermediate stops from starting point to point of destination. In the particular that this machine is able to maintain its equilibrium automatically and to be self-righting against the influence of adverse natural gusts, and due to the fact that the machine sets up in flight artificial air gusts to counteract the natural eddies, it is more dependable than most types of present-day air-craft. In that this machine has a large multi-blade propeller as a main driver flanked, at the opposite end of the machine where it is itself located, by two supplementary propellers and in that the planes extend in a consecutive series from end to end of the machine the lifting and lowering efficiency is increased in direct proportion as is its speed. In addition to the plane tilting or deflecting tendency of the air-reacting portions of the machine lifting and lowering fans are provided to avoid running the machine on the ground for the necessary momentum suitable for lifting purposes. These lifting and lowering fans are driven by motors which are electrically propelled from electric current generated from the engines that drive the driving propellers.

With the above and other objects in view the present invention consists in the combination, arrangement and details of construction disclosed in the drawings and specification, and then more particularly pointed out in the appended claims.

In the drawings wherein similar reference characters designate similar parts thruout the several views, Figure 1 is a top plan view of my invention in one form.

Figure 2 is a front elevation thereof.

Figure 3 is a side elevation thereof.

Figure 4 is a detail view, partly in section, showing the construction of plane and lifting fan for conjoint tilting movement.

Figure 5 is a fragmentary front elevation of the machine.

Figure 6 is a longitudinal view of the machine with one wall removed.

Figure 7 is a plan view of the machine with its top removed.

Figure 8 is a diagrammatic view of a modification of flying machine.

Figure 9 is another diagrammatic view showing the action of the tilting planes.

Figure 10 is a plan view, partly broken away, of the front propeller fans showing their universal movement controlled from a unitary device.

Figure 11 is a side elevation, partly broken away, of one form of propeller shifting mechanism.

Figure 12 is a fragmental view of the cabin showing a buffer arrangement.

Figure 13 is a plan view of part of the mechanism for shifting the angle of the front propeller fans.

Figure 14 is a plan view of a propeller fan and a universal connection to the operating motor.

Figure 15 is a diagrammatic view of the circuit controlling the electrical driving of the propeller lifting fan driving motors.

Figure 16 is a vertical sectional view of the aviator's control of the various moving parts of the machine.

Figure 17 is a side view of a modification showing scoops arranged to direct air against the planes.

Referring to the drawings which are merely illustrative of my invention the several parts of my invention are shown. My flying machine consists of three buoyant bodies, being preferably hollow so as to contain cargo, freight and passengers. The central body is preferably the cabin where the passengers are accommodated, the other bodies being fuselages. 10 and 12 designate the fuselages and 11 designates the central cabin; these fuselages and cabin are preferably made of uniform length and may extend parallel or may converge towards the front so long as they provide two or more air ducts or channels M and N between the central cabin and fuselages for equilizing and stabilizing purposes. The inner walls 13 of the fuselages at the front of the machine may be beveled while the opposite walls of the front terminal of the cabin 11 may have forwardly converging sides 14. The inclined walls 13, 14 provide flaring entrances into the air ducts or channels M and N. The parts 13, 10 together with 11 are supported by an open framework and M and N are passageways inclosed on the right and left respectively.

Two propeller shafts 15 are extended rotatably from the fuselages 10 and 12 and carry propeller fans 16 and 17. It will be noticed that the front terminal of the central cabin is not provided with a propeller fan. At the rear of the machine is located a shaft 18 extending into the cabin 11 and mounted rotatively on shaft 18 is a relatively large gigantic multi-blade propeller wheel 19 being powerful compared with the front smaller propellers 16 and 17 and designed to act as the main driving propeller.

It will particularly be noticed that this propeller 19 is of such a diameter that it bars the adjacent ends of the air channels or ducts M and N and in its sweep it intersects these ends so that when this propeller is in motion so great is the vortex created very close to these last named ends of the air channels that a suction is created in these air channels causing the violently displaced air to back up, rise as two walls or currents of dense air and impinge against the opposing sides of the cabin 11 as well as against the adjacent sides of the fuselages 10 and 12. This causes one displacement of air commensurate with the longitudinal axis of the machine which impels the machine and sustains it in flight and another displacement vertically against the effective surfaces of the opposing walls of the cabin, the air displaced in each case being sufficiently powerful to overcome gravity in one case and to resist pitching of the cabin in the other case.

With this fundamental construction of the body of the flying machine it will be seen that better control is given the aviator of the sustaining planes and a greater area or surface allowed these planes whereby they may extend as a separated longitudinal series as monoplanes or biplanes, as the case may be, from one end of the machine to the other end thereof. Thus four biplanes are illustrated as one embodiment of this idea. The upper planes are designated respectively 46, 46ª, 46ᵇ, and 46ᵈ; the lower planes which are disposed parallel with corresponding upper planes are designated respectively 46', 46ᵇ', 46ᶜ', and 46ᵈ'.

A frame 20 envelops the wheel 19 and is connected to the rear of the cabin 11. A vertical rudder shaft 21 is connected in a frame 23 secured to frame 20 of the machine and arranged to turn with shaft 21 is a vertical rudder 22 for steering the machine toward the left or right as will readily be understood by those skilled in the art. At the bottom of this shaft 21 is a pulley 88' on which is trained a chain hereinafter referred to. On a base support 24 forming an appendage to the frame 23 is a horizontal shaft 25 upon which is journaled a horizontal rudder 26 whereby the ship is assisted materially in going upwardly or downwardly.

A frame 27 is suitably connected to the machine having journal boxes 29 in which are rotatively received the ends of a shaft 28 upon which are fixed the traction wheels 30 located at the center of the machine. There are several wheels 30 as shown in Figure 3 by means of which the machine may be run upon the field into its hangar. The flaring entrances into the air ducts or channels are designated O.

It is designed preferably to drive the main drive suction-producing multi-blade wheel 29 by a steam plant a high power rapidly-generating steam generator being employed, or the combined expansive qualities of air and steam in an appropriate type of motor may be employed. The front supplemental propellers are employed principally as stabilizing agents seeing that there are two propellers at the front of the machine straddling the central cabin while there is one relatively larger propeller at the rear of the machine straddling the air channels at the same time. The shaft 18 carrying the large powerful multi-blade wheel 19 carries a pulley 31 on which is trained a belt 32 passing around another pulley 33 fixed upon a shaft (not designated) the pulley 31 being fixed upon the shaft 34 journaled in a bearing 35 secured upon the flooring of the cabin 11, in which bearing the other shaft carrying pulley 33 is also journaled. Shaft 41 connected to motor 42 carries a pulley 37 upon which is trained a belt 38 also trained upon another pulley 39 fixed upon the same shaft upon which pulley 33 is mounted. Motor 42, thru shaft 41 and drive connections above described drives the shaft 18 of the wheel 19. A steam engine 44 is located in the power plant room of the cabin at the rear of the machine, which room is in charge of the engineer with assistants. Steam is lead into the engine thru the steam domes 45 or other appropriate steam suppliers or generators.

Owing to the fact that there are a plurality of planes employed to properly react against the atmosphere under influence of the propellers and that they extend longitudinally of the cabin and side fuselages it is necessary to provide greater speed and better stability because of the increase in the weight of the machine. Nevertheless owing to the use of the high power suction and driving propeller wheel 19 at the rear of the machine and of the self-righting feature of the front straddling propellers, as well as the action of the artificial high-pressure air gusts acting in and thru the air channels, the machine can be made heavier with sufficient compensating factors to make it speedier and safer in the course of its flight. To assist raising and lowering of the machine without troublesome balancing influences, the helicopter propeller fans 52 are provided which may be duplicated at the top or bottom of the machine. These helicopters are designed to tilt in unison with and at the same angle with the wings are planes 46, etc.

The wings or planes are interconnected in parallelism by means of the crossed rods or similar expedients 47 and 48, which are diagonally and pivotally connected to the opposing ends of the wings or corners thereof, the rods 47, 48 preferably passing thru shafts 49 (illustrated in Figure 4) suitably journaled in the cabin walls. The cabin 11 may be made wider and higher than the fuselages or bodies 10 and 12 as shown in Figure 3 if this will subserve a better balancing arrangement. The hollow fuselages are made to contain look-outs or other operators as well as cargo.

The helicopter shafts 51 also pass thru the shafts 49 so that upon the rotation of the shafts 49 or any of them the shafts 51 and rods 47, 48 must turn with them thereby tilting simultaneously the planes 46, etc., and the helicopter fans 52. This is illustrated diagrammatically in Figure 9. The tilting of these wings of course controls the direction of upward or lowered movement of the machine as well understood by those skilled in the art. It will be understood that the arrangement of the crossed connections 47, 48 is repeated a number of times longitudinally of the wings or planes 46, etc., as are the helicopter fans 52. The shafts 49 extend from end to end of the planes as shown in Figure 2 so that while the rods 47, 48 support the planes longitudinally the shafts 49 are designed effectively to simultaneously turn the planes or wings 46, etc. The tilt of the planes and helicopters is sufficient to allow the machine to ascend or descend in conjunction with the tilting of the rudder 26 supplied to take care of the rather unequally weighted engine-room end of the machine. The planes can be constructed of any desired stiffened material of proper length and thickness and width according to the load to be sustained in flight and will have proper resiliency as well. The helicopters are very light bodies and are readily supported in bearings mounted upon the wings themselves the shafts 51 for rotating them being simultaneously operated thru cross-shafts 52ª shown in Figure 1, thru drive connections not shown.

It is necessary that the helicopter shafts 51 be rotated while they tilt together with the wings 46, etc. For this purpose a separate motor is provided for each main shaft 51 of each series of helicopters driven thru the cross shafts 52ª. These motors 54 are operatively strung and supported oscillatively upon the shafts 51 intermediate their ends and these motors are operatively provided with drive instrumentalities 55 and 56 by which shafts 51 are rotated. The turning of the shafts 49 tilt all the shafts 51 in unison and cause the motors 54 to tilt with them while the gearing 55 and 56 function to rotate the helicopters.

Pins 57 carried by the shafts 51 project guidedly into slots 58 formed upon plates 59 secured rigidly upon the flooring of the cabin along the center line thereof as shown in Figure 7. Sprockets or similar positive drive elements 53 are provided centrally of the cabin 11 upon shafts 49 and sprocket chain 54 is trained upon all of these sprockets 53 for the purpose of simultaneously turning all of the shafts 49 at the same time, there being another sprocket 58 suitably rotatatively supported upon which and another sprocket 58 on the same shaft with the first sprocket 53 is trained another chain 55, and on the shaft 56 of sprocket 58 is a miter gear 57 which meshes with another miter gear 58' fixed upon a shaft 62 which conveys motion to a miter gear 63 which meshes with another miter gear 64 on a polygonal portion of a vertical shaft 75, a sleeve 65 being secured to gear 64.

For the purpose of raising or depressing the gear 64 into and out of clutched and driven relation with the gear 62 a foot pedal 69 is operatively connected to sleeve 65. This sleeve rests depressingly upon a stout spring 66 which itself rests upon an arm 67 of a support 68 secured upon the flooring of the cabin at its front end. The spring 66 is fixedly secured at one end upon the shaft 75 and holds this shaft spaced at its lower end from a clutch element 86 mounted rotatively upon a pintle 89 operatively journaled in vertical position. On shaft 89 is a sprocket wheel 87 upon which is trained a sprocket chain 88 which is also trained upon the sprocket wheel 88', fixed upon the vertical rudder shaft 21. A spring 84 is coiled around the lower end of shaft 75 and is also held suspended upon the arm 67 of bracket or support 68. A clutch element 85 carried at the extreme lower end of shaft 75 cooperates with clutch element 86.

A sleeve 73 is rotatively mounted around a cylindrical portion of the control shaft 75 and this sleeve carries a collar 72 of suitable diameter to which is secured one end of a rope 70 which is passed upon a number of pulleys or rollers 71 wherever needed, the opposite end of this rope being attached to the horizontal rudder 26 at the tail end of the machine. This rope passes thru a hand wheel 77 which controls the several parts of the shaft 75. This hand wheel is located within easy reach of the hands of the aviator who is seated in the seat 90 at the front of the machine, where he has complete view and circumspection of the atmosphere about him thru any of the windows shown in the front of the machine as illustrated in Figure 3.

The hand wheel 77 is yieldably secured at the uppermost end of the shaft 75 where it is splined slidably on said shaft, being held against sliding downwardly thereon by a spring 81. This wheel operatively carries a clutch element 82 for interengagement with another clutch element mounted upon the upper end of the rotatable sleeve 73.

In operation it is designed to enable the aviator while sitting in the seat 90, or the pilot similarly sitting, to interchangeably operate together or separately the various movable control parts of the machine. It will be necessary to provide means for locking these movable parts in assigned position. This forms the subject-matter of another application. Normally the operator can turn the wheel 77 without pressing downwardly thereupon, the latch bar 78 working against the tension of a spring 80 to allow this. As wheel 77 thus turns gears 63, 64 meshingly turn shaft 62 which thru the connections hereinbefore described turns the shafts 49 thereby causing the planes and helicopter fans designated 46, etc. and 52 respectively to tilt, the direction of tilting depending obviously upon the direction in which the hand wheel 77 is turned. Thus the machine can be caused to ascend or descend the continuously rotating helicopters assisting in this function. The machine can rise without running the machine considerably upon the ground due to these helicopters. The operator can instantly whenever desired kick in or down the pedal 69 thereby separating or disconnecting gears 63 and 64 and thus keeping the planes horizontal. Should the operator wish to operate the vertical rudder simultaneously with the plane tilting mechanism he simply presses downwardly slightly upon the hand wheel 77; this depresses spring 84 enough to allow clutch elements 85 and 86 to interengage whereby sprockets 87 and 88' are turned and the vertical rudder operated while the plane tilting mechanism is also operated at the same time. It will be noticed that as spring 84 is depressed the shaft 77 slides thru sleeve 65 and spring 66 without depressing said spring; and it will further be noticed that that hand wheel 77 has not been depressed far enough to connect clutch elements 82 and 83 because the latch bar 78 locks hand wheel 77 to its spline not allowing this wheel to slide upon its spline; consequently the shaft is bodily depressed to connect clutch elements 85 and 87.

Similarly the plane tilting mechanism, the helicopter tilting mechanism, and the horizontal rudder can be conjointly operated from the operator's seat very conveniently. The plane tilting mechanism is operated in the mere act of turning the hand wheel. The operator pushes back on the latch bar release device 79 while maintaining turning pressure upon the hand wheel; this releases hand wheel 77 from its spline and allows this wheel to slip downwardly on its spline until clutch elements 82 and 83 interconnect. This allows the operator to hold these clutch elements interlocked and he then turns the hand wheel 77 causing the sleeve 73 to turn whereby the rope 70 is pulled or jerked in the desired direction operating the horizontal rudder accordingly.

It may become necessary to operate simultaneously the vertical and horizontal rudders but not the plane tilting mechanisms; as where the machine is directed to turn about its center at an inclination. This is readily accomplished by the operator stepping down upon the pedal 69 while he releases the hand wheel from its spline at the upper end of shaft 75; he connects clutch elements 82 and 83 after pressing the hand wheel slightly downwardly against the tension of spring 81; he presses some more down upon shaft 75 after clutch elements 82 and 83 are interconnected; this slides shaft 75 down thru sleeve 65, connects clutch elements 85 and 87 together against the tension of spring 84 and drives the chain that operates the vertical rudder; the spline allows shaft 75 to turn as the hand wheel turns the collar 72 on sleeve 73 that carries clutch element 83, so that the horizontal rudder is also operated.

By allowing the gears 63 and 64 to intermesh and removing pressure upon the pedal 69 all the mechanisms can be operated. The simultaneous control of the vertical and horizontal rudders has just been explained and now the plane tilting mechanism also operates. It will thus be seen that one aviator has complete control of all the moving parts of the machine.

It is designed to shift the front propeller shafts 15 universally or upwardly and laterally. It will be found advantageous to do this accordingly as the adverse influences of natural gusts affecting the front part of the machine dictate, as where the machine is to be steered head-on in one direction when a severe wind tends to pull it counteractingly in a counter direction. The propeller shafts 15 may then quickly be turned in an opposite direction to that in which the ship is being pulled as it is being steered, thus neutralizing the counteracting adverse effects of the natural severe gusts. And if the wind exerts a violent severe downward pressure upon the ship as it is desired to ascend the propeller shafts 15 can be directed downwardly. In any shifted position of the propeller mechanism will be adequately provided to hold these shafts in adjusted position.

The operator already given control compactly of the means for directing the ship in its course is also given instant and quick control of this propeller-shaft shifting mechanism thru another hand wheel normally arranged in alinement with the other hand wheel 77. This hand wheel is shown in Figures 6 and 11 where it is designated 77ᵃ. It may be mounted in one form of construction upon a vertical shaft 106 contained rotatively in a bearing 107 and imparting movement to a miter gear 102 which meshes with another miter gear 100 which is connected operatively to a sleeve 99 into which is received the respectively right and left handed threaded ends of two rods 95 and 96 which in this instance will be guided horizontally in bearings (not shown) so that the propeller shafts 15 may be swung laterally but not vertically.

Figure 13 shows how these shafts may be operated both vertically as well as laterally and horizontally. It will be noted from Figure 14 that each propeller shaft 15 is connected to a universal pivot suitably supported as at 91; its free end is again universally connected as at 94 to a sleeve 114 in which fits with a polygonal edge in telescoping relation a shaft 117 driven directly from a motor 118; there being two motors 118, one for each shaft 15 and these motors are preferably mounted in the fuselages 10 and 12. The shafts 15 may thus be tilted vertically or laterally the telescoping parts 114 and 115 allowing a compensatory action. The rods 95 and 96 are shown in Figure 10 to be universally connected to the ends of the shaft extensions 93.

Referring now to Figure 13 it will be seen that the right and left hand threaded ends of rods 95 and 96 are screwed into the connecting and bridging sleeve 99 which sleeve has a miter gear 101 rotatively connected thereto; this gear 101 meshes with another gear 102 fixed upon a shaft 103 carrying the hand wheel 104 which will also be disposed in alinement with hand wheel 77. The yoke 105 on sleeve 99 holds gear 102 in permanent connection with gear 101. A worm and worm wheel might be substituted in place of the gears 101 and 102. It will now be seen that the shaft 103 acts as a handle whereby without rotating the gears the two rods 95 and 96 can be turned with shafts 15 upon universal pivots 92 so the shafts 15 can be raised or lowered; by rotating gears 101 and 102 the sleeve is turned causing the rods to separate the ends of shafts 15 nearest the motors a greater or less distance apart so that their front propeller-carrying ends may converge or diverge as may be desired. Similarly while these shafts 15 are thus lifted they may be converged or diverged instantly. These shifted movements may be constrained to last as by locking the parts in assigned position while the operator operates the other controls of the machine.

The machine may have buffer springs 112 arranged in a consecutive series in special compartments arranged parallel with any given number of its side walls, top bottom, etc.; the springs 113 being shown secured vertically. These springs act as buffers in case of any violent collision whereby the cargo or passengers may possible escape injury.

As the rear end of the machine may be heavier than the front or any other portion due to the engines, and accessories as well as the larger propeller wheel 19 I may arrange, as shown in Figure 8 diagrammatically certain tiers of planes or wings to subject a greater effective sustaining surface at this end of the machine. Thus the planes may be disposed in an ascending series from the front towards the rear end of the machine; the greatest number of wings in vertical alinement being at the rear and the least at the front, the center having two sets of wings more than the frontmost planes and less than the rearmost wings. Other ideas can be effectively utilized along similar lines.

The motors 54 are all driven by electricity, being electric motors and they drive the relatively light helicopters. The main motor 42 (see Figure 15) driven from the engines 44 is connected by its shaft 119 and supported miter gear 120 with a miter gear driven from gear 120 and designated 121. Gear 121 is on a shaft 121' of an electric generator 122 that furnishes current to feed the motors 52. A wire B runs from the generator 122 and connects by terminals E and D to motors 54, two in number; the other two motors 54 being connected by terminals E' and F' to a wire A coming from the other side of generator 122; a neutral wire C leaves the generator 122 and connects by shunt wires G, H, I, J, to all the four motors. In this way a return is provided from all motors to the generator no matter which way it received current whether thru one wire A or B.

Figure 17 shows an arrangement where a series of longitudinally spaced apart scoops 123 are provided upon the opposite sides of the cabin so as to project into the air channels M and N. They point upwardly towards the upper planes 46, etc. so that when a suction is created by propeller wheel 19 in these air channels the artificial gusts direct air under pressure against the planes to better sustain the machine.

It will be seen from an inspection of Figure 7 that various quarters are provided for passengers, assistants, etc., as at 125, while quarters 124 are set apart for freight and cargo. The quarters 126 afford parlor conveniences for the passengers, and contain stores for selling necessities. Everything necessary to maintain all the works of the machine can be done in the separate engine and machine shop quarters at the rear of the cabin. Should something happen to the front propellers or helicopters the main drive wheel 19 will bring the machine safely to earth. Should anything happen to main driving wheel 19 the front propellers and helicopters can allow machine to safely descend.

From the foregoing description it will be seen that my invention contains an embodiment of certain controls whereby better equalization, balancing and stability is given the flying machine in flight; whereby the action of severe natural gusts and eddies is counteracted by artificial gusts; and wherein the displaced air is made to automatically stabilize the machine. Numerous changes may be resorted to in practice without departing in spirit from the details herein disclosed.

What I desire to claim and secure by Letters Patent is:—

1. A flying machine consisting of a plurality of hollow bodies, a plurality of planes movably connected longitudinally of said bodies, there being two air channels intervening between said bodies, propellers located in front of the outermost bodies, and a relatively larger multi-vane propeller located at the rear of the central body and having a sweep completely across the adjacent ends of said air channels.

2. A flying machine of the kind described consisting of a longitudinal cabin flanked by a plurality of coextensive fuselages whereby air channels are formed extending on either side of said cabin, a plurality of planes movably connected longitudinally of all of said fuselages as well as of said cabin, means carried by said planes and connected to said cabin for lifting the machine, propellers carried by said fuselages at the front of the machine, and a relatively larger blower propeller connected to the rear of said cabin and being of a diameter greater than the distance between the inner sides of said fuselages.

3. A flying machine of the kind described consisting of a longitudinal cabin flanked by a plurality of fuselages of any length therewith, said fuselages and cabin defining opposing air channels, a propeller mounted at the front of each fuselage, and a single relatively larger blower propeller connected rotatably to said cabin at its rear for the purpose of forcing currents of air through said air channels.

4. A flying machine of the kind described consisting of a central elongated cabin, a plurality of fuselages spaced coextensively and longitudinally alongside said cabin so as to provide longitudinal air ducts on either side of said cabin, a plurality of planes operatively connected above and below said cabin and fuselages, lifting propellers carried by said planes and connected to said cabin, means at the front of the machine and adjacent the front of the cabin for propelling said machine, and a single relatively large blower propeller rotatingly mounted upon the cabin at its rear and effective to create a suction in said air ducts.

5. In a flying machine a stabilizing apparatus consisting of a plurality of coextensive bodies providing between them air channels, a plurality of planes movably connected longitudinally of all of said bodies, a pair of driving propellers operatively connected each to the outermost body, and a larger and more powerful propeller operatively connected to the central body at the end opposite to that where the former propellers are disposed, and having a sweep intersecting the planes of said air channels.

6. In a flying machine a stabilizing apparatus consisting of a plurality of coextensive bodies, the central body being wider than the outermost bodies, a plurality of planes movably connected above and below said bodies in alinement, a single driving propeller connected to the central body at one end and located in close proximity to each air channel adjacent its end, a pair of propellers smaller than the first propeller mounted on the outermost bodies, and mechanism within said central body for driving all of said propellers.

7. In a flying machine, a stabilizing apparatus consisting of a plurality of co-extensive bodies providing on either side of the central body two co-extensive air channels, a propeller carried by the first and third body, a larger propeller immediately in the back of said central body and having a circumferential series of vanes effectively and synchronously sweeping across the combined area of the adjacent ends of both air channels whereby during the motion of said propeller sustaining air currents are caused to flow through said air channels for engaging the opposite sides of said central body.

8. A flying machine consisting of a central cabin having a forwardly converging prow, two coextensive fuselages arranged at either side of said cabin and providing a pair of air channels on either side thereof, the inner sides of said fuselages curving in a direction opposite to the adjacent side of the prow of said cabin whereby the adjacent ends of said air channels flare outwardly, small propellers connected respectively to the fuselages at the flaring ends of said air channels, a series of tiltable planes connected to said fuselages and cabin, and a relatively large blower propeller connected to said cabin at the opposite end of the machine and intersecting in its sweep the adjacent ends of said air channels.

9. A flying machine consisting of a central cabin, an even number of bodies extending in space-apart relation from each side of said cabin so as to provide co-extensive air channels, means at the front of the machine disposed independently of said cabin for propellingly balancing the machine, and means at the rear of the machine disposed independently of said bodies for simultaneously pushing the machine and for powerfully inducing the displaced air to flow through said air channels to stabilize all of said bodies.

10. In a flying machine the combination of a central cabin, a plurality of flanking bodies, propeller shafts mounted upon said bodies on either side of said cabin, motors in said bodies for driving said shafts, and unitary means in said cabin designated to swing said propeller shafts in the same direction or opposite directions.

11. In a flying machine the combination of a central cabin, two flanking fuselages, propeller shafts mounted in said fuselages, motors in said fuselages for turning said shafts, and mechanism in said cabin designed to allow both shafts to swing vertically in the same or in opposite directions.

12. In a flying machine the combination of a central cabin and flanking bodies, propeller shafts rotatably mounted in said bodies, propeller fans projecting from said shafts beyond said bodies, said shafts capable of swinging vertically and horizontally, and a single control hand wheel connected to said shafts for actuating them in unison.

13. In a flying machine the combination of a central cabin and flanking bodies, propeller shafts mounted in said bodies and projecting therethru said shafts being capable of universal movement, a hand wheel for actuating said shafts in unison, a depending stem carrying said hand wheel, steering mechanism, plane tilting mechanism, a hand wheel beneath and in line with the other hand wheel, and means separately controlled from the second hand wheel for operating said steering mechanism and tilting mechanism interchangeably.

14. In a flying machine the combination of a cabin, a plurality of planes disposed above and below said cabin in vertical parallel alinement, scoops disposed alongside said cabin on either side thereof, fuselage flanking said scoops and providing opposing air channels in which said scoops are disposed, and mechanism located at one end of said machine and controlled from said cabin for creating forced gusts of air to flow upwardly in said air channels being directed by said chutes against the planes and being urged by said mechanism against the sides of said cabin to sustain the same stabilizingly.

In witness whereof he has hereunto set his hand this 7 day of February, 1925.

JOHN BOLGIANO.